(12) United States Patent
Whitesell

(10) Patent No.: US 6,515,391 B2
(45) Date of Patent: Feb. 4, 2003

(54) ELECTRICITY GENERATOR WITH COUNTER-ROTATING COLLECTORS IN A RADIAL MAGNETIC FIELD

(75) Inventor: Eric James Whitesell, Carlsbad, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 20 days.

(21) Appl. No.: 09/894,377

(22) Filed: Jun. 27, 2001

(65) Prior Publication Data

US 2001/0045790 A1 Nov. 29, 2001

Related U.S. Application Data

(63) Continuation-in-part of application No. 09/315,654, filed on May 20, 1999.

(51) Int. Cl.[7] .......................... H02K 13/04; H01R 39/04
(52) U.S. Cl. ...................... 310/178; 310/127; 310/148; 310/266
(58) Field of Search ................................ 310/178, 248, 310/143, 148, 127, 114, 266

(56) References Cited

U.S. PATENT DOCUMENTS

| 561,803 | A | * | 6/1896 | Mayer | 310/178 |
|---|---|---|---|---|---|
| 1,791,978 | A | * | 2/1931 | Sessions | 310/178 |
| 2,677,066 | A | * | 4/1954 | Serna | 310/178 |
| 3,944,865 | A | | 3/1976 | Jewitt | |
| 4,347,456 | A | | 8/1982 | Chabrerie | |
| 4,975,609 | A | * | 12/1990 | McKee | 310/178 |
| 6,051,905 | A | | 4/2000 | Clark | |

FOREIGN PATENT DOCUMENTS

| GB | 2814 | * | 3/1910 | 310/178 |
|---|---|---|---|---|
| WO | PCT/US81/01588 | | 6/1982 | H02K/31/00 |
| WO | WO82/02126 | * | 6/1982 | H02K/31/00 |

* cited by examiner

Primary Examiner—Karl Tamai
(74) Attorney, Agent, or Firm—Andrew J. Cameron; James A. Ward; Michael A. Kagan

(57) ABSTRACT

An electricity generator is disclosed having electrically conductive, counter-rotating collectors arranged coaxially with a magnetic field extending radially from an axis of rotation. The collectors intersect the radial magnetic field perpendicularly and are electrically connected to each other to conduct current flow in opposite directions to balance the interaction between current flow in the collectors and the magnetic field.

12 Claims, 4 Drawing Sheets

US 6,515,391 B2

ELECTRICITY GENERATOR WITH COUNTER-ROTATING COLLECTORS IN A RADIAL MAGNETIC FIELD

CROSS REFERENCE TO RELATED APPLICATIONS

This application is a continuation-in-part of U.S. patent application Ser. No. 09/315,654 filed May 20, 1999, entitled ELECTRICITY GENERATOR WITH COUNTER-ROTATING COLLECTORS IN A RADIAL MAGNETIC FIELD.

BACKGROUND OF THE INVENTION

The present invention relates generally to electricity generators and particularly to electricity generators having no stator.

In 1831 Michael Faraday rotated a copper disk adjacent to a pole of a stationary magnet with the magnetic field lines perpendicular to the plane of the disk. Faraday discovered that rotating the disk resulted in a voltage generated between the center and the outer edge of the disk. Electrical power could then be extracted from the disk from terminals connected to the disk by sliding contacts or brushes coupled to a central axle of the disk and to the disc's outer periphery.

The Faraday disk generator was developed in the late 1890's and the early part of this century into a high power, low voltage direct current generator suitable for industrial electroplating applications. These generators typically have a stator and a rotor to couple the electric and magnetic fields for generating power.

Faraday also discovered that power was generated from the disk even when the magnet was rotated together with the disk. This type of generator requires no stator. Because the generation of a voltage by a conductor that is stationary relative to the source of the magnetic field has not been explained by classical theory, statorless generators have not been widely exploited.

SUMMARY OF THE INVENTION

An electricity generator is disclosed having electrically conductive, counter-rotating collectors arranged coaxially within a magnetic field extending radially from an axis of rotation. The collectors are electrically connected to each other to conduct current flow in opposite directions to balance the interaction between current flow in the collectors and the magnetic field.

An advantage of the present invention is that its design may be readily scaled to provide a desired voltage and current output.

Another advantage of the invention is that the source of magnetic energy may be incorporated into a rotating collector, therefore no stator is required.

DESCRIPTION OF THE INVENTION

Figure 1:
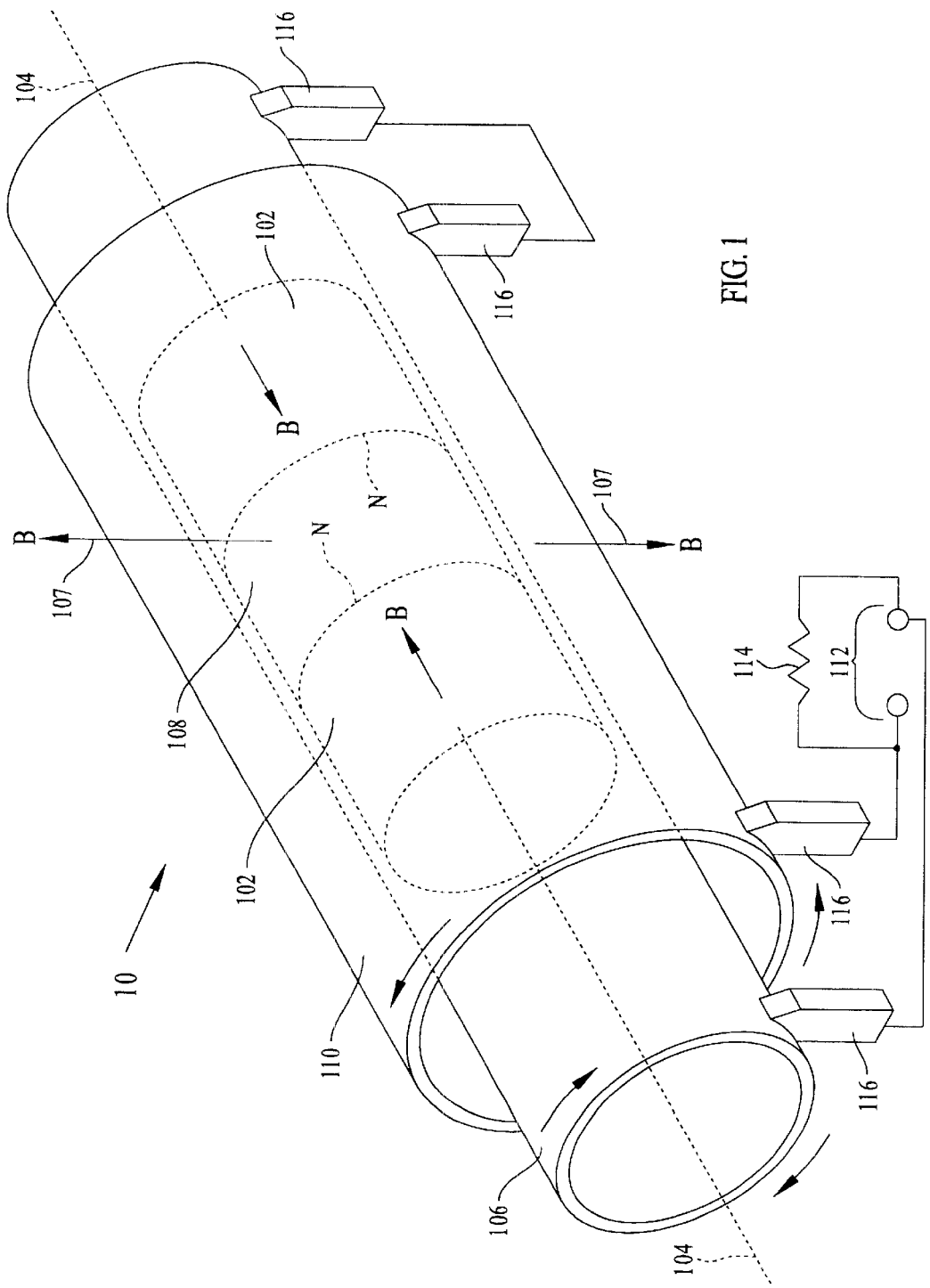
FIG. 1 is an illustration of a basic configuration of the electricity generator of the present invention.
Figure 4:
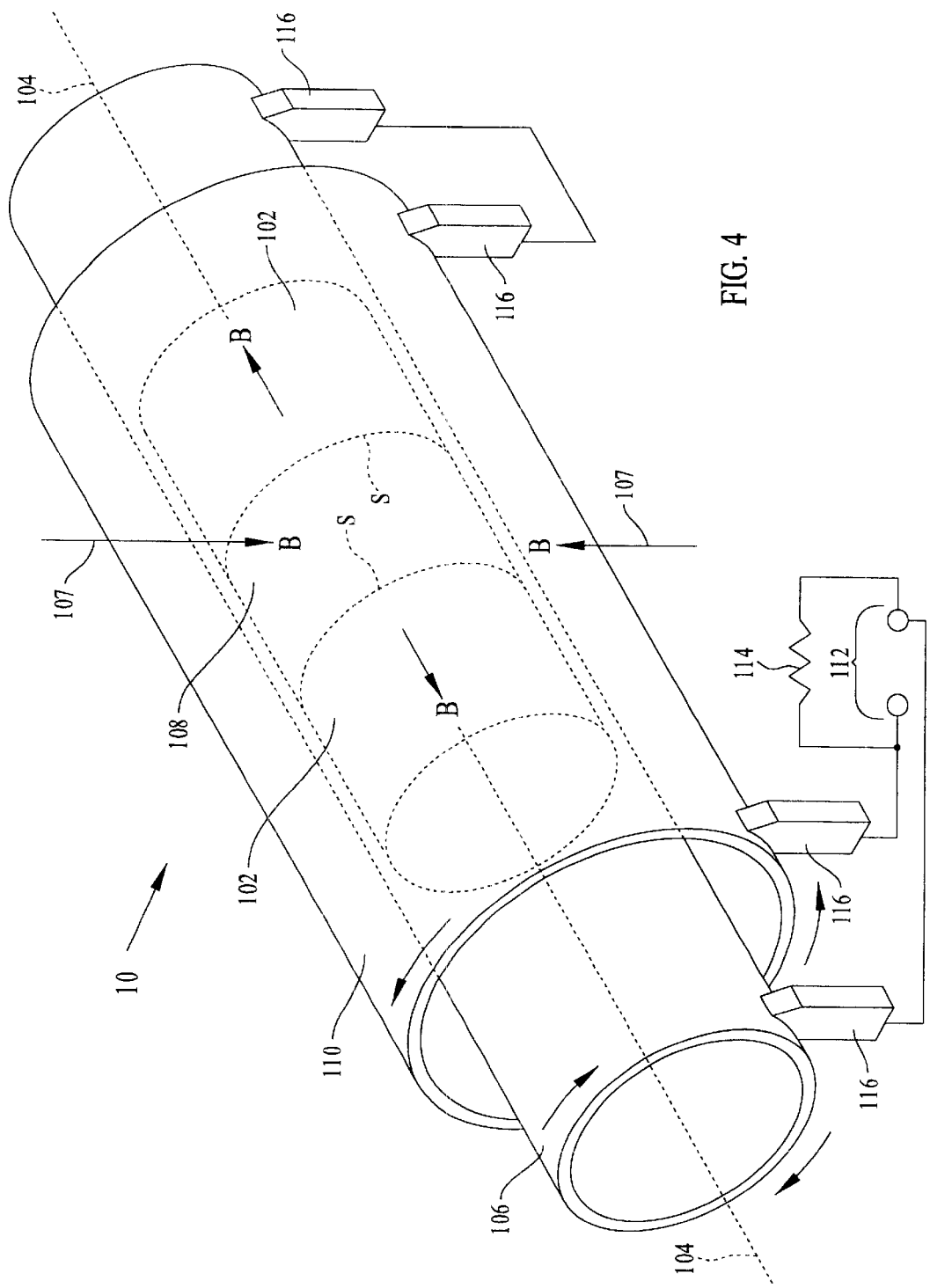
FIG. 4 shows another embodiment of the invention wherein the south poles of the coaxially aligned magnets face each other.

FIG. 1 is an illustration of a basic configuration of the electricity generator 10 of the present invention. In this embodiment, a magnetic field 107 extends radially outward from an axis of rotation 104 from magnets 102 which provide a magnetic field source. Magnets 102 are preferably generally cylindrical in shape and are magnetized along the cylindrical axis with the poles on the opposite faces of each cylinder. Magnets 102 are arranged coaxially along an axis of rotation 104 with their north poles N facing each other as shown in FIG. 1. Alternatively as shown in FIG. 4, magnets 102 may be arranged with their south poles S facing each other, where the direction of the magnetic fields 107 of magnets 102 are shown to extend radially inward with respect to axis of rotation 104, i.e., in a direction opposite of the radial magnetic field direction of magnetic field 107 represented in FIG. 1. It is to be understood that shapes and polar geometries other than those shown for magnets 102 may be used to generate radial magnetic field 107. Magnets 102 may be electromagnets, permanent magnets, or combinations thereof. Examples of permanent magnets are alnico magnets, samarium-cobalt magnets, and neodymium-iron-boron magnets. A pole piece 108 preferably made of soft iron or other highly magnetically permeable material may be inserted between magnets 102 to conduct magnetic field 107 radially from axis of rotation 104. Alternatively, a non-permeable spacer may be inserted between magnets 102 so that the magnetic field extends radially from the axis of rotation. Magnetic field 107 extends radially from the axis of rotation, that is, magnetic field 107 is perpendicular to the axis of rotation.

Still referring to FIG. 1, an electrically conductive inner collector 106 closely encloses magnets 102 and is preferably electrically insulated from magnets 102. An electrically conductive outer collector 110 is arranged coaxially with inner collector 106, preferably concentric with and in close proximity to inner collector 106 without making electrical contact with inner collector 106. Inner collector 106 and outer collector 110 are disposed to perpendicularly intersect magnetic field 107. One advantage of the radial arrangement of magnetic field 107 is that the magnetic field is distributed along the circumference of the inner collector 106. The circumference of the inner collector 106 has a higher linear velocity than an inner portion of a conventional disk, therefore the cross-product of charge times velocity is higher than for the inner portion of a disk intersecting a parallel magnetic field. A convenient shape for inner collector 106 and outer collector 110 is a cylinder, although other shapes may be used to suit various applications. Inner collector 106 and outer collector 110 preferably have a length as short as practically possible to minimize power losses due to ohmic resistance and may be made of brass, copper, or other suitable electrical conductors, including superconductors.

Brush contacts 116, or brushes, make sliding electrical connections between inner collector 106 and outer collector 110 on one side of magnetic field 107 and sliding electrical connections between inner collector 106 and outer collector 110 on the other side of magnetic field 107 to output terminals 112. Brush contacts 116 may make contact from outside outer collector 110 and inner collector 106 as shown or from inside inner collector 106 and outside outer collector 110. Other well known configurations and positions for brush contacts 116 may be used to practice the present invention as may be advantageous for particular applications. Brush contacts 116 may be made of copper, graphite, and other known solid conductors as well as liquid metals such as mercury.

In operation, inner collector 106 is rotated about axis of rotation 104 in one direction and outer collector 110 is rotated about axis of rotation 104 in the opposite direction.

The directions of rotation shown by the arrows in FIG. 1 are interchangeable. The motion of inner collector 106 and outer collector 110 through magnetic field 107 induces a voltage across each of inner collector 106 and outer collector 110. The electrical connection between inner collector 106 and outer collector 110 conducts electrical current flowing through inner collector 106 across magnetic field 107 opposite and parallel to the electrical current flowing through outer collector 110 across magnetic field 107 to offset possible interaction between magnetic field 107 and magnetic fields generated by the electrical current. The voltage developed by the series connection of inner collector 106 and outer collector 110 is applied to load 114 through output terminals 112. Although collectors 106 and 110 are counter-rotating in this example, other embodiments may be contemplated in which brush contacts 116 are connected to conduct electrical current in opposite directions through inner collector 106 and outer collector 110 rotating in a common direction or if only one of inner collector 106 or outer collector 110 rotates.

Figure 2:
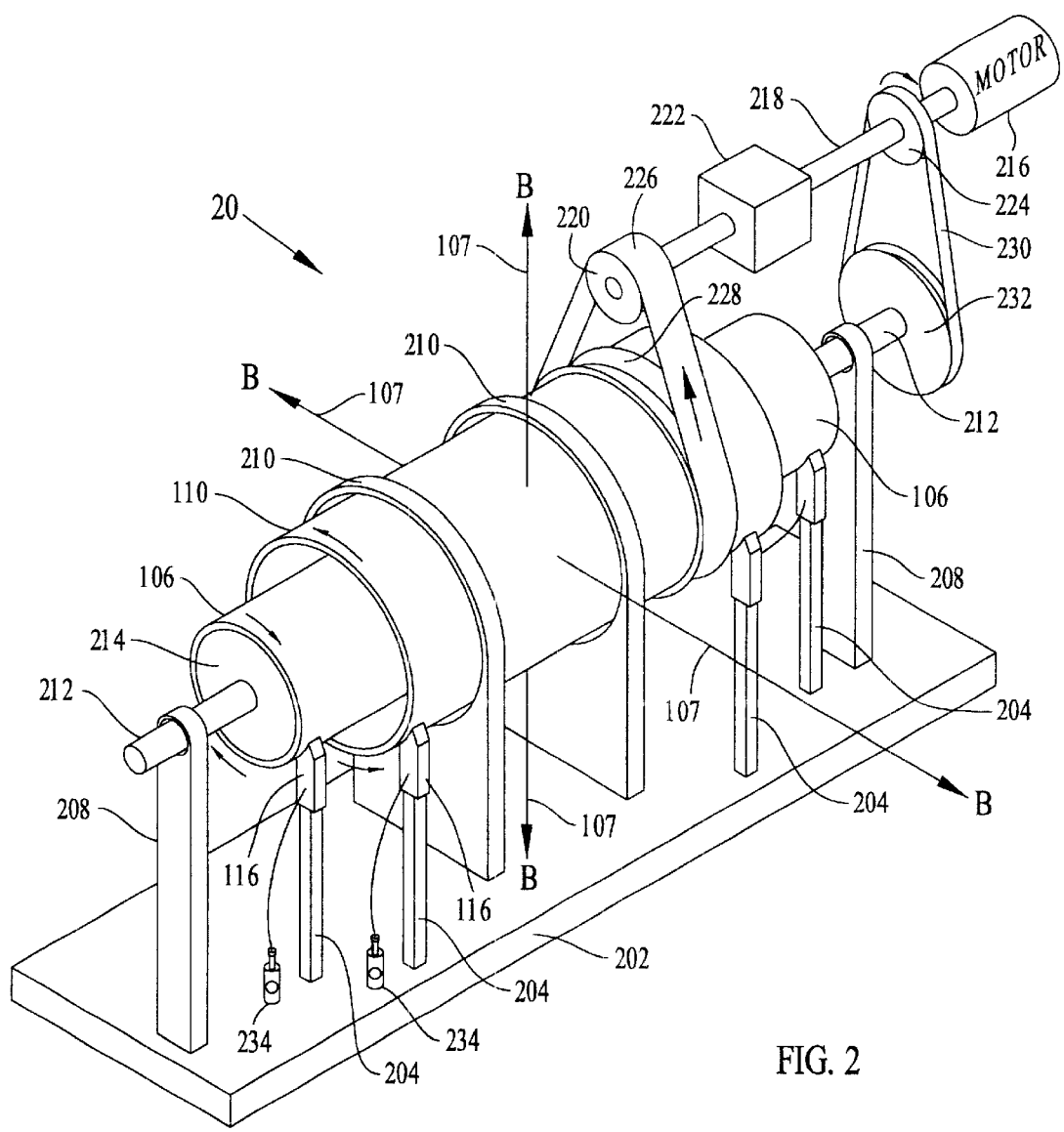
FIG. 2 is an illustration of a mechanical frame for the generator of FIG. 1.

Referring to FIG. 2, mechanical frame 20 provides mechanical support for inner collector 106 and outer collector 110 and for brush contacts 116. Brush contacts 116 are mounted on brush supports 204 fastened to a base 202. Inner bearings 208, outer bearings 210, and binding posts 234 are also mounted on base 202 according to well known techniques. Binding posts 234 provide electrical terminations for connecting to brush contacts 116. Inner bearings 208 support shafts 212 extending from end pieces 214 fastened to inner collector 106. End pieces 214 generally are made of an electrically insulating, non-magnetically permeable material to avoid eddy current losses and magnetic field distortions. However, in the scope of the invention includes the use of other types of materials for end pieces 214. For example, there may be some applications where it may be desirable for end pieces 21 to be made of electrically conductive and magnetically permeable materials.

Figure 3:
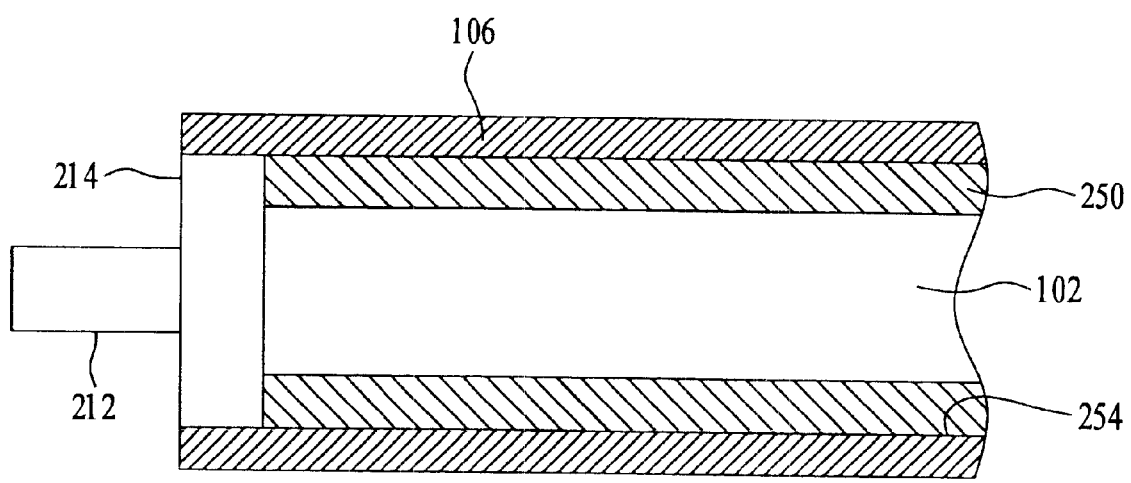
FIG. 3 shows a cross-sectional view of the magnet mounted in the inner collector.

Magnets 102 may be fastened to end pieces 214 by an adhesive, or they may simply be butted against the end pieces 214 without an adhesive. Alternatively, as shown in FIG. 3, magnets 102 may be mechanically supported, for example, within an electrically insulating sleeve or tube 250 that surrounds and supports magnets 102, where tube 250 is supported by the inside wall 254 of inner collector 106. Tube 250 and outer bearings 210 support outer collector 110 and allow it to rotate around inner collector 106. By way of example, tube 250 may be made of an electrically nonconductive, non-magnetically permeable material such as plastic. Examples of suitable plastics include ABS®, polycarbonate, nylon, and Zytel®. The end pieces 214 also secure magnets 102 and tube 250 inside inner collector 106.

A motor 216 rotates drive shaft 218, outer pulley 220, differential drive 222, and inner pulley 224 according to well known techniques. Drive belt 226 couples outer pulley 220 to outer collector pulley 228. Drive belt 230 couples inner pulley 224 to inner collector pulley 232. Differential drive 222 provides counter-rotation between inner pulley 220 and outer pulley 224. Alternatively, outer collector 110 may be allowed to freewheel without coupling to outer pulley 220. In that case, current generated by rotating inner collector 106 passes through outer collector 110 and interacts with magnetic field 107 to produce counter-rotation of outer collector 110. Likewise, inner collector 106 may be allowed to freewheel without coupling to inner pulley 224. In that case, current generated by rotating outer collector 110 passes through inner collector 106 and interacts with magnetic field 107 to produce counter-rotation of inner collector 110. Alternatively, a voltage may be applied to binding posts 234 to induce mechanical rotation of inner collector 106 and outer collector 110.

Various modifications and variations of the present invention may be possible within the scope of the following claims to practice the invention otherwise than described above.

I claim:

1. An electricity generator comprising:

an electrically conductive and annular inner collector having an inner wall and coaxially arranged along an axis of rotation to intersect a magnetic field perpendicularly for rotating about the axis of rotation in a first direction;

a magnetic field source for providing the magnetic field extending radially with respect to the axis of rotation and for rotating about the axis of rotation in the first direction with the inner collectors wherein the magnetic field source is enclosed by the inner wall;

an electrically conductive outer collector coaxially arranged along the axis of rotation to intersect the magnetic field perpendicularly for rotating about the axis of rotation in a second direction opposite the first direction;

a first output terminal and a second output terminal for coupling an electrical current to an electrical load;

a first electrical connection between the first output terminal and the inner collector;

a second electrical connection between the inner collector and the outer collector for conducting the electrical current across the inner collector through the magnetic field opposite and parallel to the electrical current flowing across the outer collector through the magnetic field;

and a third electrical connection between the outer collector and the second output terminal;

wherein the first, second, and third electrical connections are stationary with respect to the axis of rotation.

2. The electricity generator of claim 1 further comprising a source of rotation coupled to at least one of the inner collector and the outer collector.

3. The electricity generator of claim 1 wherein the magnetic field source comprises a first magnet and a second magnet having like poles facing each other.

4. The electricity generator of claim 3 wherein the magnets comprise at least one of neodymium, iron, boron, alnico, and ceramic.

5. The electricity generator of claim 3 further comprising a pole piece between the first magnet and the second magnet.

6. The electricity generator of claim 1 wherein the inner collector and the outer collector are cylindrical in shape.

7. The electricity generator of claim 1 wherein the electrical connections comprise brush contacts made of at least one of graphite, gold, silver, copper, and a liquid metal.

8. The electricity generator of claim 7 wherein the liquid metal is mercury.

9. The electricity generator of claim 1 further comprising a mechanical frame for supporting the magnetic field source, the inner collector, the outer collector, the electrical connections, and the output terminals.

10. The electricity generator of claim 9 further comprising an end piece having a shaft mechanically coupling the inner collector to the frame.

11. The electricity generator of claim 9 further comprising a motor coupled to at least one of the inner collector and the outer collector.

12. The electricity generator of claim 1 wherein the inner collector is concentric with the outer collector.

* * * * *